US007210165B2

(12) United States Patent
Speare et al.

(10) Patent No.: US 7,210,165 B2
(45) Date of Patent: Apr. 24, 2007

(54) PRE-LICENSING OF RIGHTS MANAGEMENT PROTECTED CONTENT

(75) Inventors: John Gerard Speare, Woodinville, WA (US); Malcolm H. Davis, Kirkland, WA (US); Peter D. Waxman, Bellevue, WA (US); Marco A. DeMello, Bellevue, WA (US); Christopher F. Graham, Kirkland, WA (US); Jason M. Cahill, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/697,916

(22) Filed: Oct. 29, 2003

(65) Prior Publication Data

US 2005/0097359 A1    May 5, 2005

(51) Int. Cl.
*H04L 29/00*   (2006.01)
*G06F 21/00*   (2006.01)

(52) U.S. Cl. .................. 726/4; 726/5; 726/6; 726/7; 705/1; 705/26; 705/59

(58) Field of Classification Search ................ 713/171, 713/200, 201; 709/225; 705/54; 380/4, 380/11; 717/11
See application file for complete search history.

(56) References Cited

U.S. PATENT DOCUMENTS

| 5,204,897 | A | * | 4/1993 | Wyman | 710/200 |
| 5,742,759 | A | * | 4/1998 | Nessett et al. | 713/201 |
| 6,009,401 | A | * | 12/1999 | Horstmann | 705/1 |
| 6,189,146 | B1 | * | 2/2001 | Misra et al. | 717/177 |
| 6,205,480 | B1 | * | 3/2001 | Broadhurst et al. | 709/225 |
| 6,263,313 | B1 | | 7/2001 | Milsted et al. | 705/1 |
| 6,327,652 | B1 | | 12/2001 | England et al. | 713/2 |
| 6,330,670 | B1 | * | 12/2001 | England et al. | 713/2 |
| 6,345,256 | B1 | | 2/2002 | Milsted et al. | 705/1 |
| 6,385,728 | B1 | * | 5/2002 | DeBry | 713/201 |
| 6,389,403 | B1 | | 5/2002 | Dorak, Jr. | 705/52 |
| 6,418,421 | B1 | | 7/2002 | Hurtado et al. | 705/54 |
| 6,487,599 | B1 | * | 11/2002 | Smith et al. | 709/229 |
| 6,502,137 | B1 | | 12/2002 | Peterson et al. | 709/229 |
| 6,587,837 | B1 | | 7/2003 | Spagna et al. | 705/26 |
| 6,597,891 | B2 | | 7/2003 | Tantawy et al. | 455/3.05 |
| 6,609,199 | B1 | | 8/2003 | DeTreville | 713/172 |
| 6,611,841 | B1 | | 8/2003 | Han | 707/102 |

(Continued)

OTHER PUBLICATIONS

J. Watkins, "COPEARMS and ERMS: Co-Operation in Rights Management in the Electronic Environment", The New Review of Infoormation Networking, vol. 4, 1998, pp. 127-133.

(Continued)

*Primary Examiner*—Nasser Moazzami
*Assistant Examiner*—Carl Colin
(74) *Attorney, Agent, or Firm*—Workman Nydegger

(57) ABSTRACT

The present invention allows for a pre-licensing process for content that is subject to rights management in order to allow a principal access to the content when the principal does not have access to the rights management server. Rather than requiring the principal to submit a rights account certificate and request for a use license to the rights management server, the present invention allows the message server to obtain a use license on behalf of the principal. Accordingly, the principal can access the use license from the message server and decrypt protected content without having to request the use license from the rights management server.

44 Claims, 11 Drawing Sheets

U.S. PATENT DOCUMENTS

| | | | |
|---|---|---|---|
| 6,643,774 B1 * | 11/2003 | McGarvey | 713/155 |
| 6,775,772 B1 * | 8/2004 | Binding et al. | 713/171 |
| 6,820,063 B1 * | 11/2004 | England et al. | 705/54 |
| 6,824,051 B2 * | 11/2004 | Reddy et al. | 235/380 |
| 2002/0066043 A1 * | 5/2002 | Ueda | 713/202 |
| 2002/0111878 A1 * | 8/2002 | Namba et al. | 705/26 |
| 2003/0015343 A1 * | 1/2003 | Chen | 174/252 |
| 2003/0078853 A1 * | 4/2003 | Peinado et al. | 705/26 |

OTHER PUBLICATIONS

L.C. Anderson and J.B. Lotspiech, "Rights Management and Security in the Electronic Library", Bulletin of the American Society for Information Science, vol. 22, No. 1, Nov. 1995, pp. 21-23.

* cited by examiner

PRE-LICENSING OF RIGHTS MANAGEMENT PROTECTED CONTENT

CROSS-REFERENCE TO RELATED APPLICATIONS

N/A

BACKGROUND OF THE INVENTION

1. The Field of the Invention

The present invention generally relates to the distribution of protected content in a rights management system. More particularly, the present invention provides for pre-licensing content subject to rights management in order to allow a principal access to the content when the principal does not have access to a rights management server.

2. Background and Relevant Art

Rights management services (RMS) provide software that protects ownership/copyright of electronic content by restricting what actions an authorized recipient may take in regard to that content. The term content refers to information and data stored in digital format including: pictures, movies, videos, music, programs, multimedia, games, documents, etc. A few of the primary functions of a RMS are to control licensing authorization so that content is unlocked only by authorized intermediate or end-users that have secured a license, and to control content usage according to the conditions of purchase or license or otherwise imposed by the author (e.g., permitted number of copies, number of plays, the time interval or term the license may be valid, or actions that may be performed on the content, such as further distribution, opening or accessing, printing, and the like). Another function of a RMS may be to identify the origin of unauthorized copies of content to further combat piracy.

Originally, the idea of rights management was used to protect against the on-line piracy of commercially marketed material such as digital periodicals, books, photographs, educational material, video, music, etc. The use of rights management, however, has become increasingly popular in the business setting to protect proprietary or confidential information within a business network. For example, a CEO of a large corporation may wish to distribute an email that includes trade-secrets. Because of the confidential nature of this information, however, the CEO may wish to limit the actions recipients may take in regard to this content. For example, the CEO may wish to allow upper-level management to read, copy, print and save the confidential information; however, she may wish to limit other employees to read-only access or to no access at all. Accordingly, through the use of RMS the CEO can specify who is authorized to view the protected content and what actions they may take in regards thereto.

The above illustrates just one of many examples of the importance of controlling content in a business network environment. Although rights management is becoming a popular tool in a business environment, there currently exist several drawbacks and deficiencies in the system. For example, typically the recipient of the protected content is required to obtain a use license from a RMS server in order to open and use the protected content. If, however, a user is on remote location or does not otherwise have access to a RMS server the user may not be able to obtain a license. Such an instance could arise when an employee downloads a protected email onto their laptop, and later opens the item when not connected to the network, e.g., when traveling. Alternatively, corporate policy may be established to protect the sensitive keys within the RMS server from those outside the network. Accordingly, the corporation may not allow access to the RMS server to employees on remote location. As such, a remote user that previously downloaded protected content before going on remote location or otherwise receives protected content through, e.g., a message server, may not be able to access the content because they cannot get authorization from the RMS server.

Another drawback of the current rights management services is the limited control over balancing the load on a RMS server. Accordingly, the RMS may fail because of an overload of requests for use licenses. For example, if a large corporation sent protected content to all of its employees and all of the employees attempt to obtain a use license at about the same time there is a potential that the RMS server may become overwhelmed and fail.

Accordingly, there exists a need for methods, systems and computer program products that provide for allowing a user access to protected content when the user does not have access to a RMS server. Furthermore, there exists a need for throttling the load on the RMS server to produce batch requests at a pace the RMS server can handle.

BRIEF SUMMARY OF THE INVENTION

In accordance with exemplary embodiments of the present invention, the above-identified drawbacks and deficiencies of current rights management service systems are overcome. For example, exemplary embodiments provide for a messaging system with a rights management server that controls the type of operations principals can perform on protected content and a message server that receives messages and makes them available to principals or their agents. Further, the present invention provides for pre-licensing content that is subject to rights management in order to allow a principal access to the content when the principal does not have access to the rights management server. For example, a message server can receive a message which is subject to rights management in that access to at least a part of the message is controlled through a rights management server. The message server may then receive a publishing license for use in identifying the message to the rights management server. Further, the message server may request on behalf of the principals one or more use licenses for allowing the principals access to the messages. The request may include the publishing license to identify the message to the rights management server.

In accordance with another example embodiment of the present invention, a messaging system is provided that pre-licenses content subject to rights management in order to allow a principal access to the content when the principal does not have access to the rights management server. This system determines the received message is subject to rights management in that access to at least a part of the message is controlled through a rights management server. The system uses a received publishing license for identifying the message to the rights management server. The message server obtains, on behalf of the principal, a use license for allowing the principal access to the message without having the principal request the use license from the rights management server.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for pre-licensing of rights management protected content. The embodiments of the present invention may comprise a special purpose or general-purpose computer including various computer hardware, as discussed in greater detail below.

Example embodiments provide for methods, systems, and computer program products for overcoming the deficiencies of other rights management service systems by providing a pre-licensing process. Accordingly, a principal wishing to obtain a use license in order to open protected content (e.g., an attachment to an email) can do so without having to access a rights management service (RMS) server. Although the following examples will be described in the context of a messaging system (i.e., the process of sending protected message content via message servers), the present invention may also be applicable to other forms of protected content such as shared folders, instant and/or text messaging, etc. As such, the examples described herein for the pre-licensing process are used for illustrative purposes only and are not meant to limit the scope of the present invention.

In order to participate in the rights management service a principal should first be enrolled. Generally, the term principal is meant to be interpreted broadly to encompass a user, process, machine, server, client, or any other device or thing capable of performing the function referred to. There are, however, embodiments in which a specific type of principal is desired. For example, as discussed in greater detail below regarding the enrollment process of FIG. 1(a), it is typically a machine that enrolls by receiving a lockbox dll. In contrast, with reference to the enrollment process described in FIG. 1(b), a user or server normally enrolls by receiving a rights management account certificate (RAC) on an enrolled machine. Accordingly, even though example embodiments of the present invention are described in the context of a particular type of principal, the term principal nevertheless should retain the broad meaning described above.

Figure 1A:
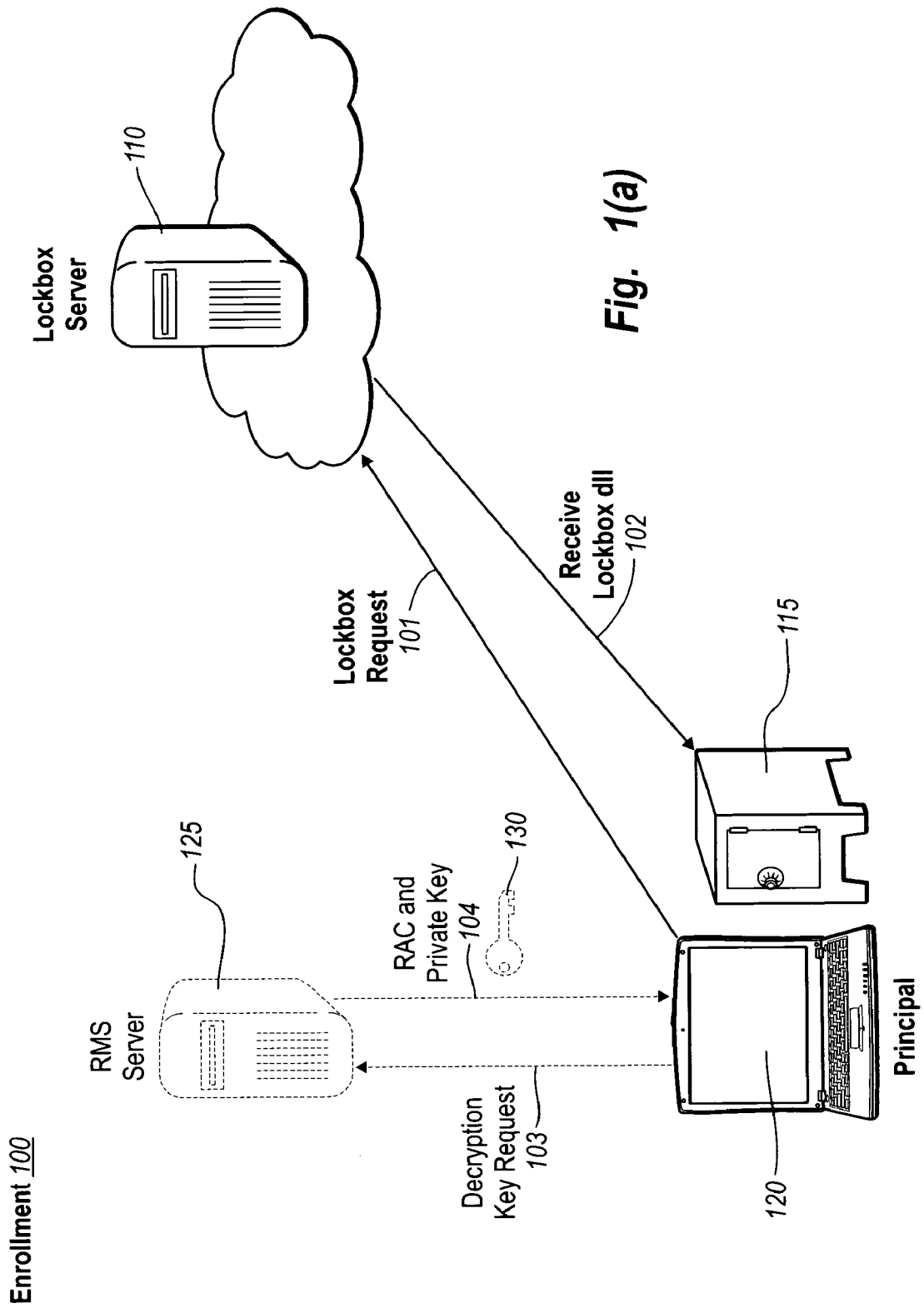
FIG. 1(a) illustrates an example of a user enrollment process for requesting and receiving software used to participate in the rights management system.

FIG. 1(a) highlights an example of a typical first action in the enrollment 100 process. A principal 120 (in particular a client or machine) should first obtain the appropriate software from a lockbox server 110. Accordingly, principal 120 sends a lockbox request 101 to lockbox server 110 and provides the lockbox server 110 with data unique to the machine. More particularly, the information provided may be physical characteristics of the machine, e.g., processor speed, CPU serial numbers, network addresses, etc. Lockbox server 100 uses this unique data to build a lockbox dll 115, which is then received in 102 by principal 120. As described in greater detail below, it is the lockbox dll 115 that will control access to protect content. Further, because the lockbox dll 115 was built with unique data from the machine, the dll 115 is machine-specific such that it will only work on that particular machine. Lockbox 115 can check for the machine's characteristics as it runs.

Now that principal 120 has software to access protected content, the principal 120 (in particular a user or server) registers with each rights management service (RMS) server that the principal 120 wishes to utilize. For example, if principal 120 wishes to participate in the rights management service for a particular business network, principal 120 register with the RMS server for that system. In other words, in order to access content controlled from a specific RMS, the principal identifies itself with the RMS server. It should be noted, for purposes of the present invention, a RMS server represents one or more RMS servers and certain interactions, other than registration (e.g., obtaining a publishing or use license, as described below), may access any of the available RMS servers.

Figure 1B:
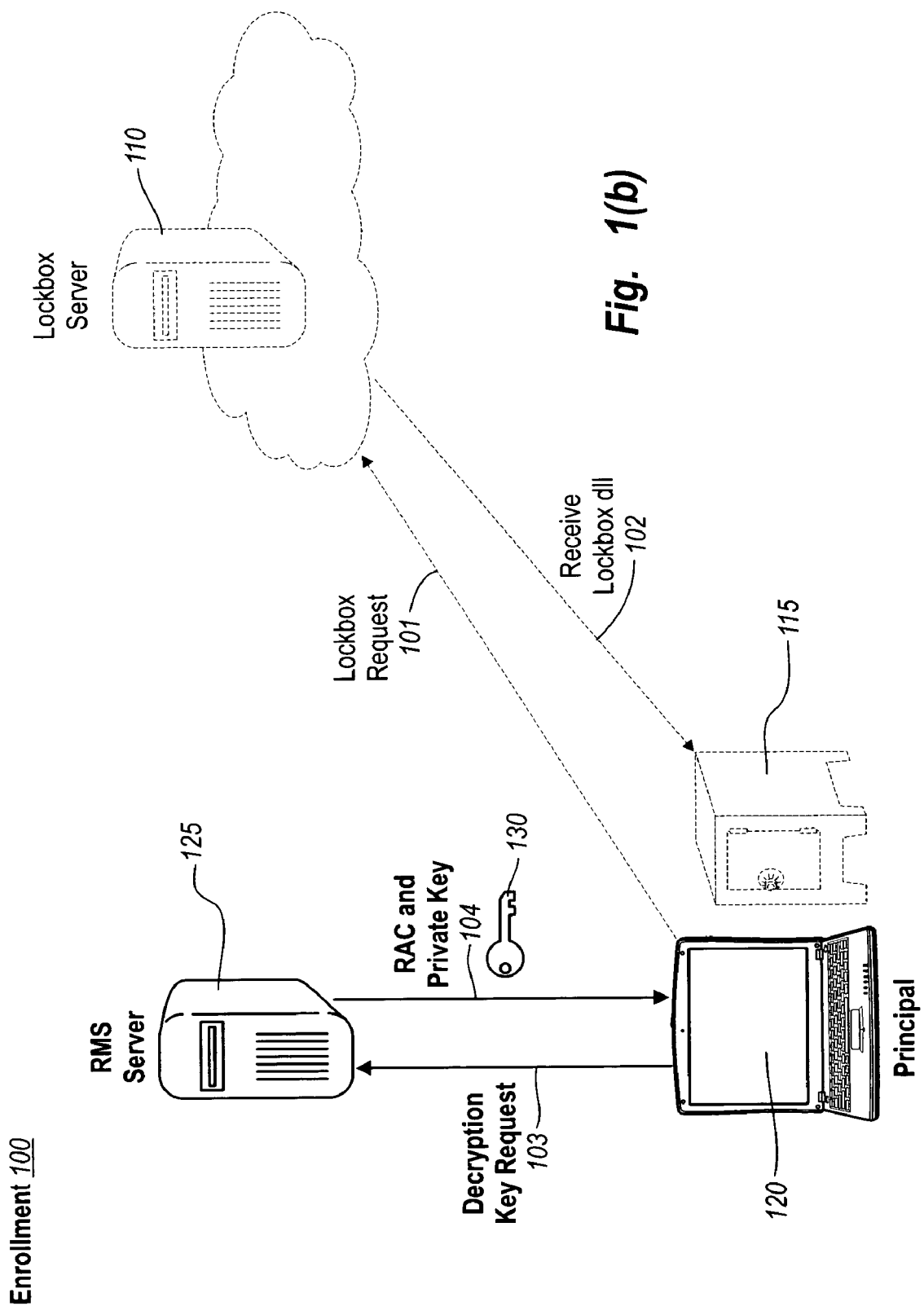
FIG. 1(b) illustrates an example of a user enrollment process for registering with a rights management server.

FIG. 1(b) illustrates an example of how principal, i.e., a user or server, 120 can register with RMS server 125 in the principal enrollment 100 process. First, principal 120 may make a request 103 for decryption keys from the RMS server 125. The principal may identify itself to the RMS server any one of many conventional authentication protocols such as basic, Kerberos, X509 certificates, Passport, etc. The principal 120 will typically receive 104 from the RMS server 125 a rights account certificate (RAC), which may be used to later identify the principal 120 as a trusted participant in the rights management service. The principal 120 also receives a private key 130 from the RMS server 125. The private key 130 is typically encrypted with a key provided in the request 103 to keep it 130 private during transport. As described below, the private key 130 will be used by the RMS server 125 to encrypt content keys the principal 120 will use to decrypt protected content. Accordingly, when principal 120 receives content that is protected the lockbox dll 115 can verify the content's authenticity, retrieve and decrypt the content key and open the content for the principal 120.

Principal 120 is now ready to participate in the rights management service. Any principal that wishes to participate in rights management either by sending protected content or in attempting to decrypt protected content will usually go through a similar user enrollment 100 routine. It should be noted that although a principle sending protected content must enroll before being able to publish the content (as described in greater detail below), a principle may receive protected content without being enrolled in the RMS system. Nevertheless, an unenrolled principle that receives protected content must enroll before being able to decrypt the protected content. Accordingly, an unenrolled principle may be guided to enroll upon attempting to access protected content.

Figure 2A:
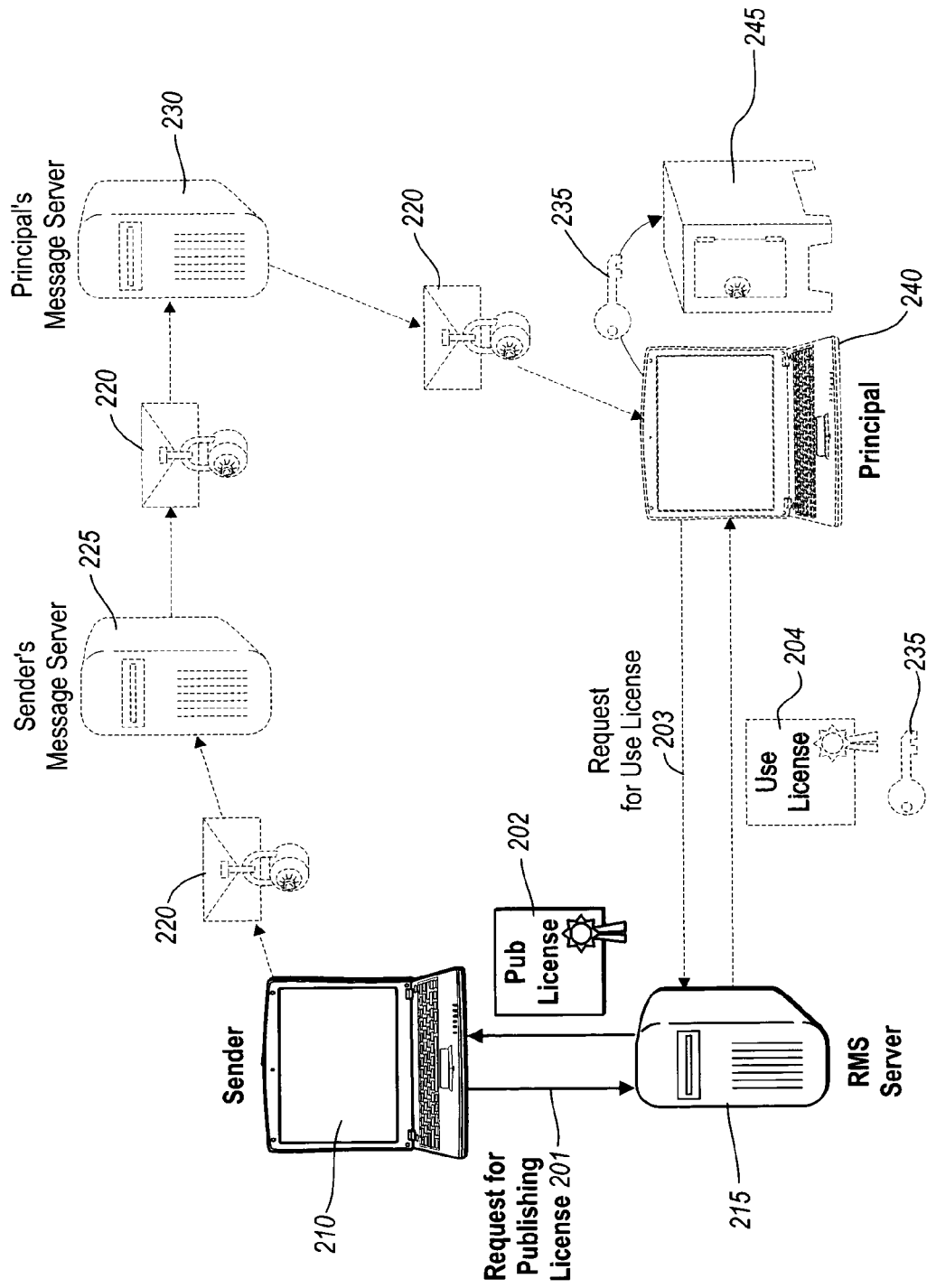
FIG. 2(a) illustrates an example of how a sender may obtain a publishing license from a rights management server for sending protected content.
Figure 2B:
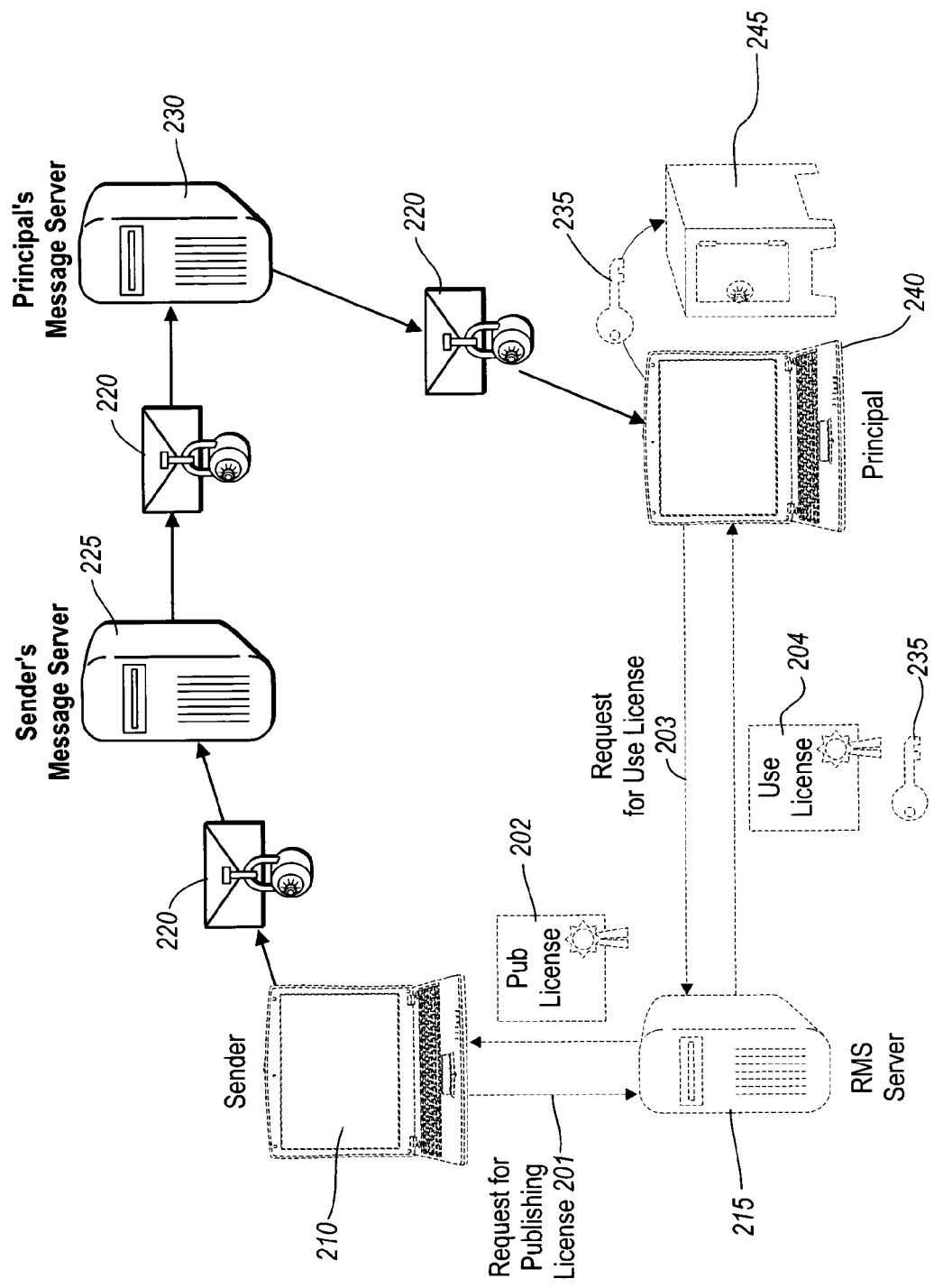
FIG. 2(b) illustrates an example of the process of sending protected content to a principal.
Figure 2C:
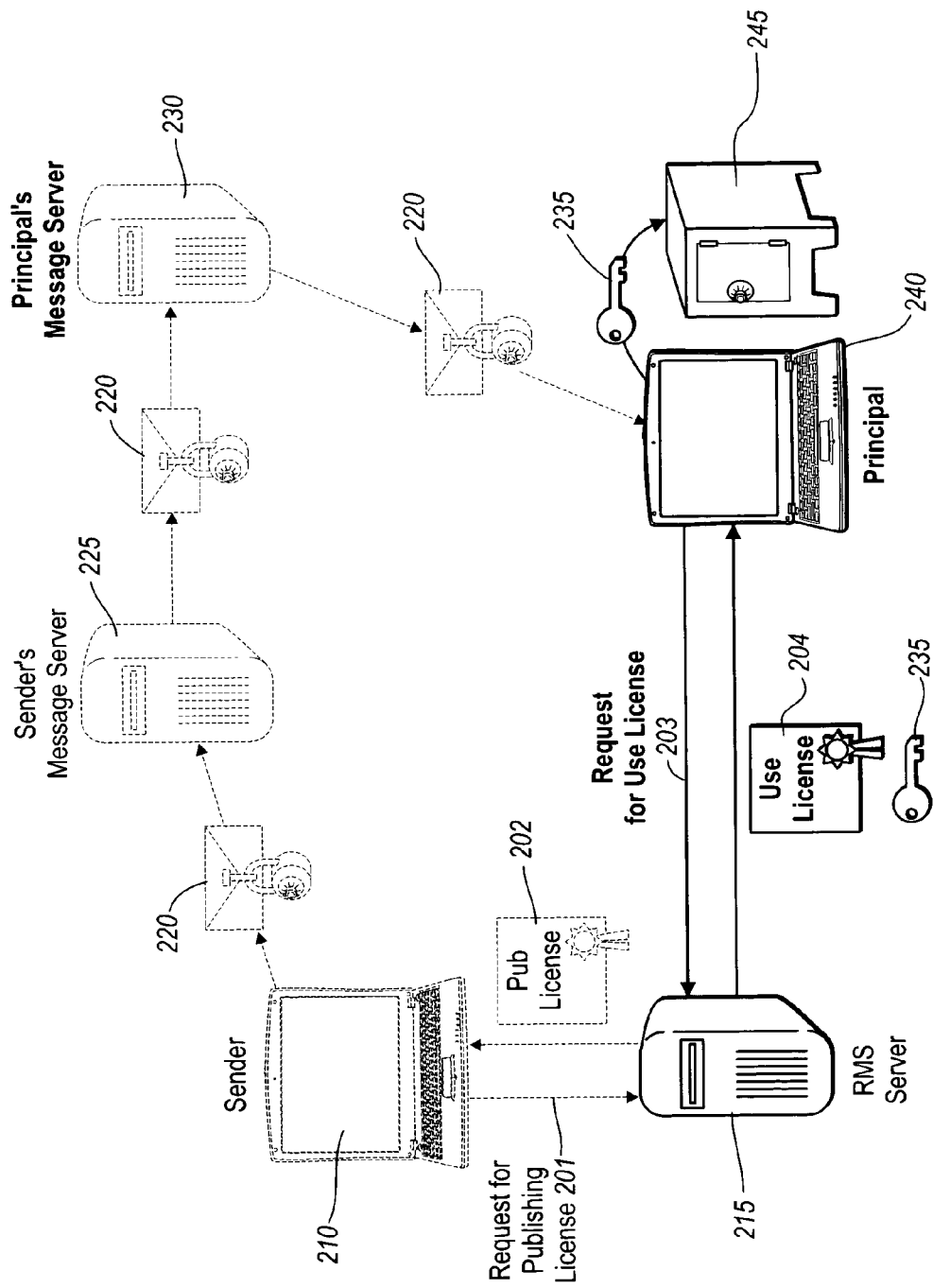
FIG. 2(c) illustrates an example of a process for obtaining a use license from a rights management server for decrypting protected content received.

Example embodiments of pre-licensing protected content are described below with regard to FIGS. 3(a)–(d). In contrast FIGS. 2(a)–(c) illustrate an example of how a sender 210 and a principal 240 of protected content may participate in the rights management process when the principal has access to a RMS server. First, as shown in FIG. 2(a), a sender should obtain a publishing license 202 to send to principal 240 with the protected content 220. Accordingly, sender 210 encrypts the content and makes a request 201 for a publishing license from the RMS 215. This request 201 may include such things as a rights expression, a content key encrypted to the public key of the RMS server, and a hash of the content. The rights expression will typically specify who the protected content is intended for and what each recipient of that content can do. The content key (not shown) is a symmetric key typically created by the sender 210 to be used in encrypting/decrypting the protected content. One embodiment provides that the RMS server 215 may save the content key in a database (not shown), which it will later send to principal 240 in the use licensing process described below. (Alternatively, as described in greater detail below, the RMS server 215 may include an encrypted version of the content key in the publishing license 202.) Finally, the hash may later be used to verify that the content does not change when received and opened by the respective lockbox dll 245.

After receiving a request 201 for a publishing license, the RMS server 215 may then create a publishing license 202, which may be encrypted information signed by the RMS server. The information may simply be any combination of the rights expression, a content key, content key identifier, and/or hash of the content. Accordingly, when the RMS server 215 later receives the publishing license 202 and a request for a use license 203 (described below) the RMS server 215 can be assured that it was the one who created the publishing license 202.

As mentioned above, the RMS server may either store the content key or include an encrypted version of the content key in the publishing license 202. If the RMS server stores the content key, the RMS server uses a content key identifier to locate the content key in its database when issuing a use license, as described herein after. Alternatively, the publishing license 202 includes the content key encrypted, e.g., to the RMS server's 215 public key. The RMS server may later decrypt the content key when issuing a use license in accordance with embodiments described below. In any event, when the term content key identifier is used in various embodiments, the term should be broadly construed to include an identifier for the content key, an encrypted version of the content key, or any other means used in obtaining a content key.

Thereafter, sender 210 receives the publishing license 202, which it can now attach to the protected content 220 to send to principal 240. This is typically a one time operation, usually done the first time the sender attempts to send protected content. FIG. 2(b) illustrates a high level overview of how a protected message 220 and the publishing license 202 may be sent from sender 210 to a principal 240. The sender 210 may simply attach the publishing license 202 to the protected message 220 and forward it to its message server 225. The sender's message server 225 then finds the appropriate principal's message server 230 and forwards the protected message 220 and the publishing license 202 to the principal's message server 230. When the principal 240 logs-on to its message server 230 the principal's message server 230 sends the protected message 220 and the publishing license 202 to the principal 240.

The principal 240 may recognize the messages as protected and attempt to obtain a use license 204 from the RMS server 215. FIG. 2(c) illustrates the process that principal 240 may go through in order to obtain a use license 204 when principal 240 has access to the RMS server 215. First, the principal 240 can make a request for a use license 203 from the RMS 215. Typically, the request for the use license will include the publishing license 202 and the principal's 240 RAC, which the RMS 215 uses to verify that the principal 240 is an authorized user.

Once the RMS server 215 verifies the authenticity of the publishing license 202 and the principal's 240 identity it can send the use license 204, which includes content key 235, to principal 240. Of course, as previously described, the content key can either be stored in a database of the RMS server 215, or it may be included in the publishing license in encrypted form. When sent in the use license 240, the content key 235 should be encrypted to the principal's private key (not shown), which was previously obtained in the registration process and stored in lockbox 245. Accordingly, when the principal 240 receives the use license 204 containing the encrypted content key 235 it can provide the use license 204 to the lockbox 245. For instance, an application (not shown) that will use the decrypted content may provide the encrypted content and use license 204 to lockbox 245. To ensure that the application is trustworthy to handle the decrypted content, the application must be certified and must present such certification to the lockbox along with the use license 204. Lockbox 245 may then uses the private key created in the registration process to decrypt the content key 235, and subsequently use the content key 235 to decrypt the content that is protected 220. Lockbox 245 can then provide the decrypted content over to the appropriate application along with the restrictions that were defined in the publishing license 202 and/or use license 204 to place the appropriate restrictions on the protected content.

When a principal does not have access to a RMS server, however, example embodiments also provide for a pre-licensing process. The following description along with FIGS. 3(a)–(d) illustrates how a principal may receive protected content and a use license without having access to a RMS server.

Figure 3A:
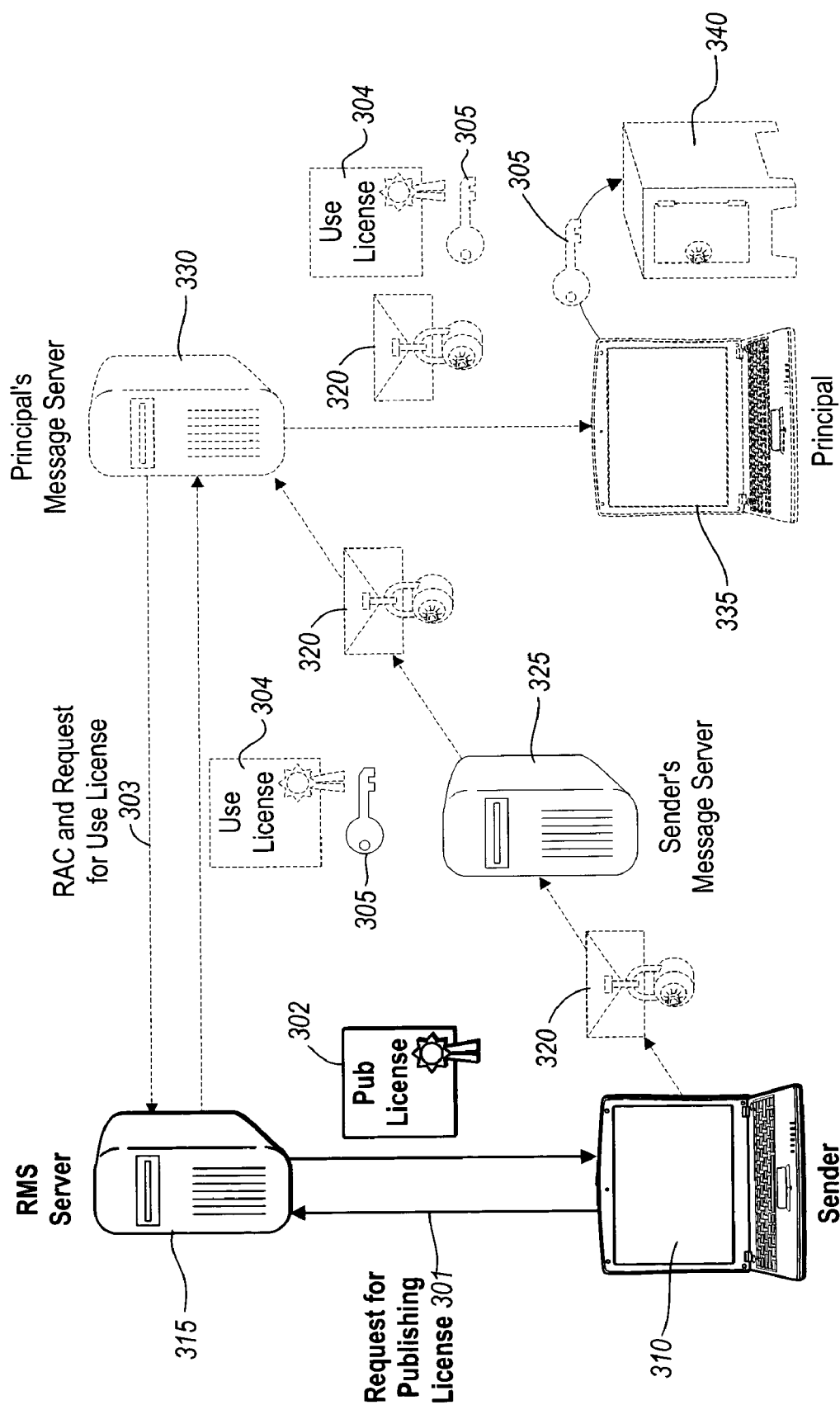
FIG. 3(a) illustrates an example of a principal requesting and receiving a publishing license from a rights management server.

Referring to FIG. 3(a), and similar to the publishing process described above regarding FIG. 2(a), a sender 310 enrolled in the rights management services and wishing to send protected content can request a publishing license 301 from a RMS server 315. As previously discussed, the request for the publishing license 301 may include a rights expression, content key and hash of the content. The rights expression defines who is authorized to receive the protected content and what they can do with such content. For example, the rights expression may limit a principal's operational rights on the content in re-licensing, printing, copying, forwarding, sharing, delegating or saving the content. Further, the rights expression may include an expiration feature, which limits, e.g., the number of times or a time period the aforementioned rights are available.

As mentioned above, the request for publishing license 301 should also include a content key 305. The content key 305 may be a symmetric key created by sender 310. As will be described below, this content key 305 is used to allow principal 335 access to protected content 320.

In addition, to the rights expression and content key the request for publishing license 301 may also include a hash of the content. As will be described in greater detail below, the hash can be used by the lockbox dll 340 to ensure that the content has not been tampered with or otherwise corrupted.

RMS server 315 receives the request for the publishing license 301 and can take at least a portion of the information provided in the request for a publishing license 301 and sign it to create publishing license 302. As previously discussed, the information provided may be any combination of the rights expression, content key, and/or hash of the content that is signed and encrypted to produce the publishing license 302. As mentioned above, example embodiments provide that after receiving the request for the publishing license 301, RMS server may either store the content key in a database or include an encrypted version of the content key in the publishing license 302. Publishing license 302 may then be provided to the sender 310, and sender 310 can now provide the protected content 320 and publishing license 302 to principal 335.

Figure 3B:
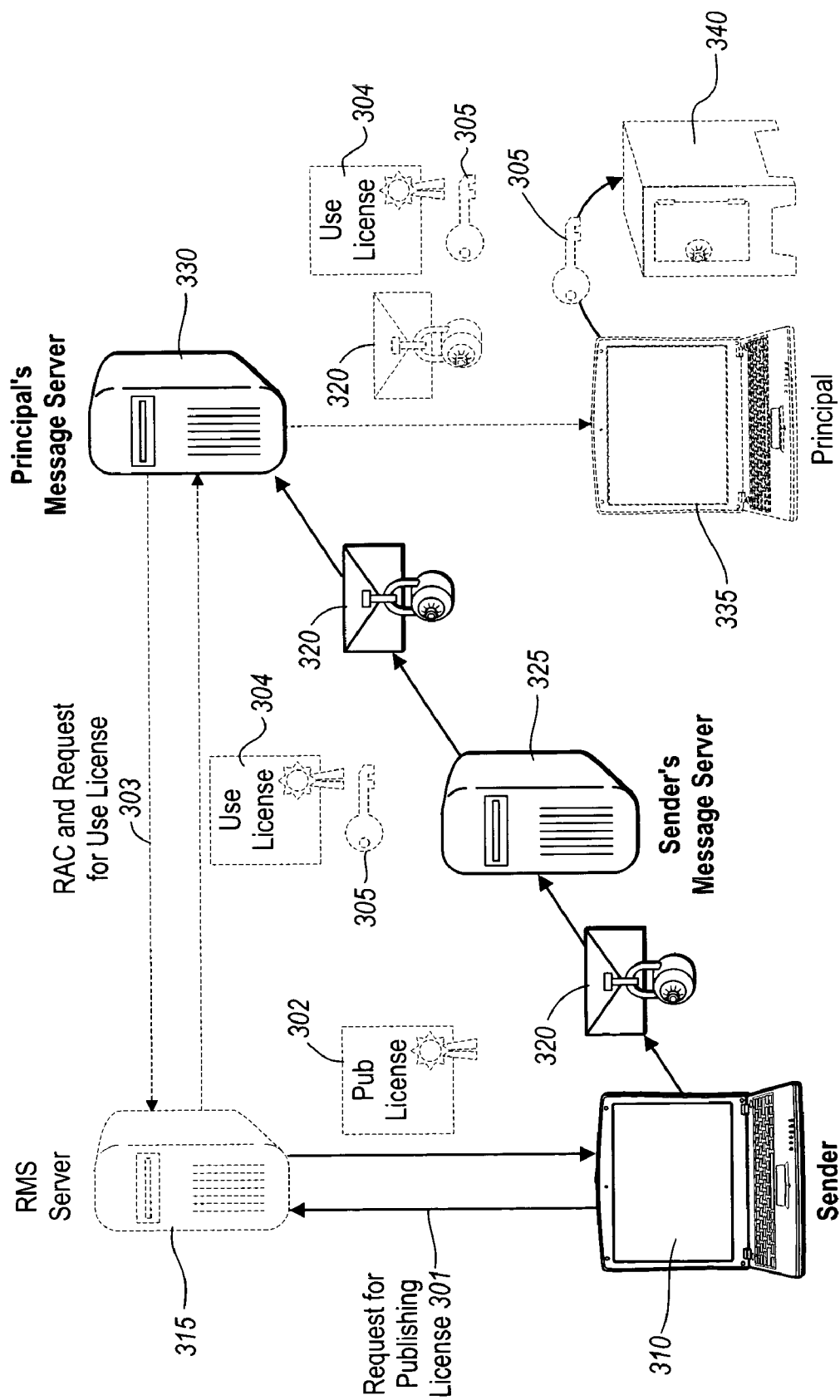
FIG. 3(b) illustrates an example of a sender sending protected content and a publishing license via its message server to a principal's message server.

FIG. 3(b) simply shows the protected content 320 and publishing license 302 being sent from the sender 310 via the sender's message server 325 to the principal's message server 330. In accordance with example embodiments, rather than the principal 335 having to request a use license from the RMS server 315 directly, the principal's message server 330 may obtain a use license 304 on behalf of principal 335, as described in greater detail below.

Figure 3C:
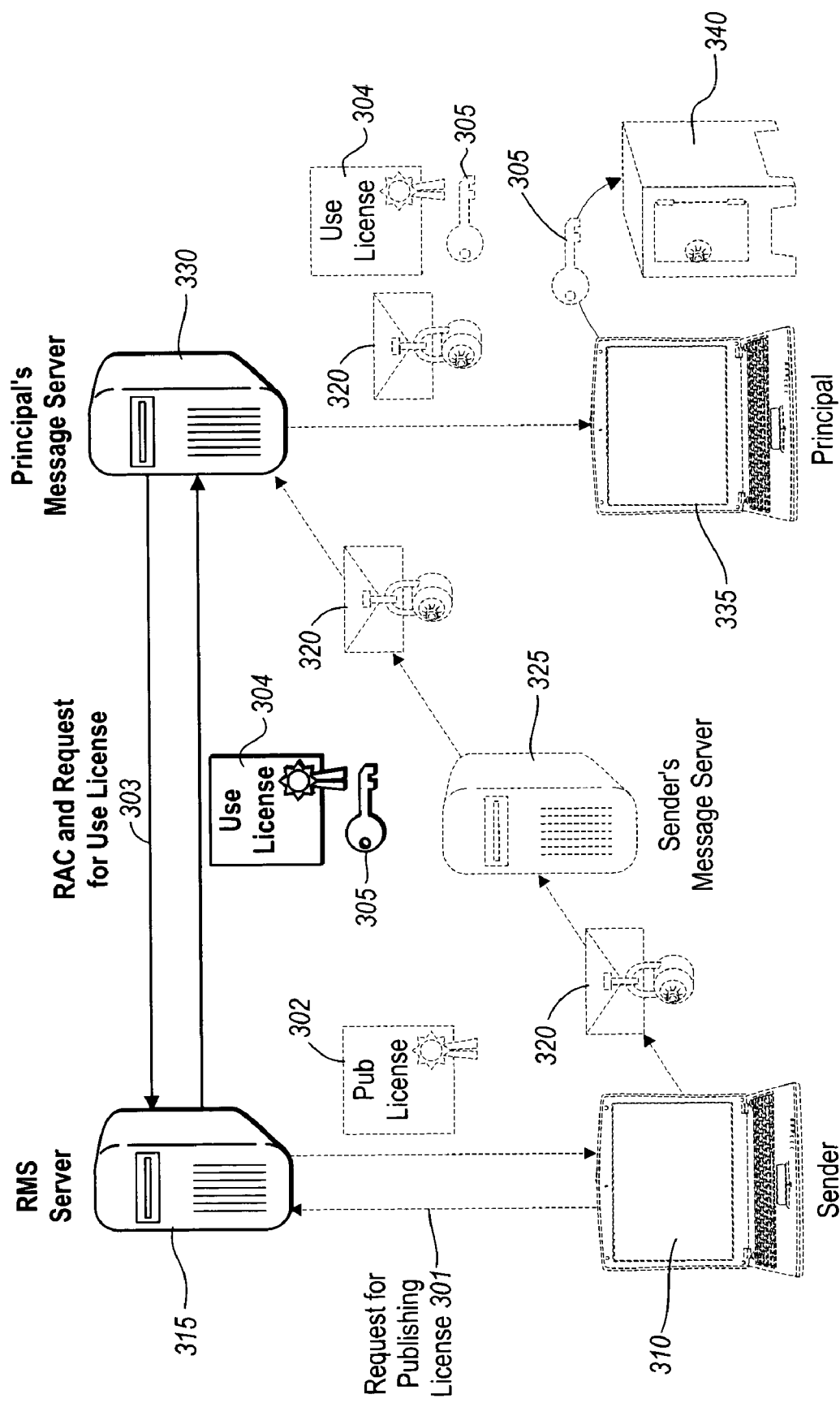
FIG. 3(c) illustrates a messaging server requesting and obtaining a use license on behalf of a principal in accordance with example embodiments.

Referring to FIG. 3(c) the principal's message server 330 makes a request for the use license 303 upon receipt of the protected content 320. More particularly, the principal's message server 330 recognizes the received protected content 320 as being subject to rights management. Accordingly, principal's message server 330 makes a request for a use license 303 and sends the publishing license 302 to the RMS server 315.

In addition to the publishing license, the RMS server may also require a rights account certificate (RAC), which as previously discussed can indicate that the requestor of the use license 304 should be trusted. Although typical rights management services require that principal's 335 RAC be used in the request for the use license 303, this additional security feature may not be needed. In particular, because the content key within the use license is encrypted by RMS 315 to a key stored in principal's lockbox 340, there is little if any risk in sending use license 304 to the wrong principal. In other words, only a particular principal has the appropriate key to unlock the content key in order to decrypt the protect content. Accordingly, if another principal received use license 304 with the content key 305 encrypted to principal's 335 private key, they would not be able to decrypt the content key 305 and access the protected content 320.

Although RMS server 315 may not require the principal's 335 RAC, example embodiments provide that the principal's message server 330 may be required to authenticate itself to the RMS server using any of the conventional protocols such as basic, Windows NTLM, Kerberos, X509 certificate, Passport, etc. Alternatively, the message server 330 may authenticate through a custom certification authentication process by sending its RAC and/or signing the request (or a part thereof) with the private key associated with the RAC. The authentication process at least ensures that the principal's message server 330 is an authority that can obtain use licenses 304 on behalf of principal 335.

Once the RMS server 315 verifies the publishing license 302 (and recognizes principal's message server 330 as an authority to receive use licenses 304 on behalf of principal 335), it may send use license 304 to the message server 330. This use license 304 includes content key 305, which as described above was either previously stored in the RMS's 315 database or encrypted and included in the publishing license 302 sent to the RMS server. As previously mentioned, when provided in the use license 304 content key 305 is encrypted to the principal's 335 private key (not shown) stored within lockbox 340.

The principal's message server 330 then stores the use license 304 with the encrypted content key 305 and the protected message 320 for future retrieval by the principal 335. Example embodiments provide that the use license 304 containing the encrypted content key 305 can be stored separately from the protected message 320. Accordingly, if the protected content has multiple recipients, only one protected message 320 is needed for storage, thereby saving valuable memory.

Other example embodiments provide the ability for the principal's message server 330 to throttle the load on the rights management server 315. In particular, if the protected message 320 is intended for a multitude of principals then the principal's message server 330 may be able to process requests for use licenses 304 in batches that the RMS server can accommodate. Although the mail may be slightly delayed, the RMS server will not be overwhelmed and crash or deny a license to a principal because a the server is overwhelmed or overloaded with requests.

Figure 3D:
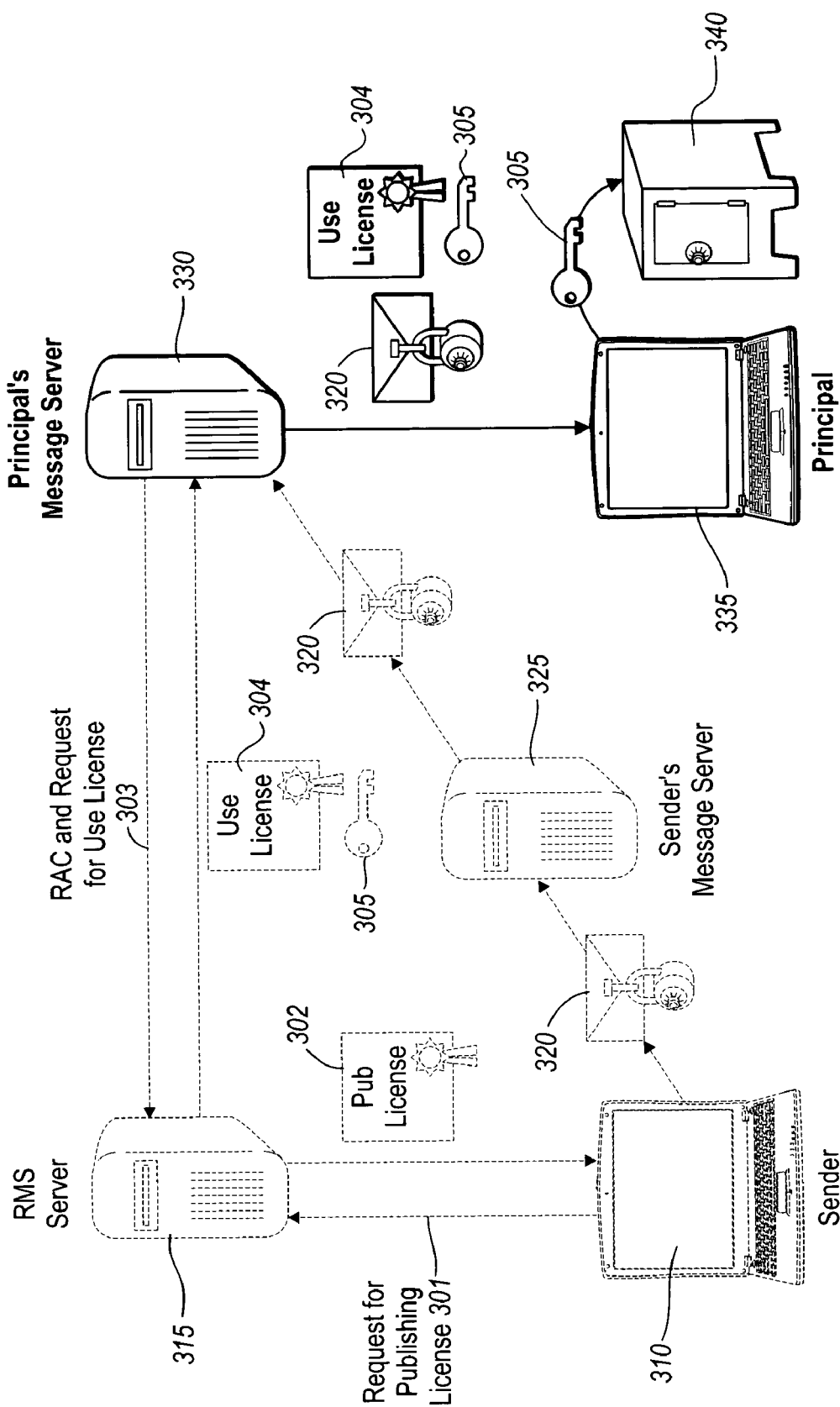
FIG. 3(d) illustrates a principal receiving protected content along with the use license from the message server in accordance with example embodiments.

As shown in FIG. 3(d) principal 335 can obtain the protected content 320 and use license 304 with the encrypted content key 305 from the principal message server 330 without contacting the RMS server 315. As before, the principal can now pass the use license with the protected content key over to the lockbox dll 340, which can then decrypt the content key 305 and subsequently decrypt the content 320. The content may then be passed to the appropriate application for viewing or otherwise using in accordance with the rights expression.

Example embodiments further provide that lockbox 340 may also check the hash received against the actual content to verify that the content has not been altered or otherwise corrupted. If the content has been compromised, the content should be discarded.

In other example embodiments, the use license may be either issued per user or per machine. When issued per user, a single use license may be copied and used by a user registered on multiple machines. In this embodiment, during the enrollment process described above with regard to FIGS. 1(a) and 1(b), the users should register with the RMS server from each machine. The decryption keys received for use in encrypting and decrypting the content key will be the same for each lockbox dll created for each machine. Accordingly, a user may copy the use license onto any machine they are registered with and use the lockbox on that machine to view or otherwise use protected content.

Other embodiments allow for the use license to be issued per machine, i.e., the private key used to encrypt a content key included in the use license are machine specific; and therefore, each machine the user has access to must have its own use license. In this embodiment, the principal's message server 330 may obtain or otherwise receive multiple use licenses 304 for the multiple machines that principal 335 may have. For example, the principal's message server 330 may recognize that principal 335 has multiple machines and thereby obtain multiple use licenses 304 for each of the principal's 335 machines. Alternatively, the RMS server 315 may recognize that principal 335 has multiple machines all of which need their own particular use license 304, and thereby provide the principal's message server 330 with all the appropriate use licenses 304.

The present invention may also be described in terms of methods comprising functional steps and/or nonfunctional acts. The following is a description of acts and steps that may be performed in practicing the present invention. Usually, functional steps describe the invention in terms of results that are accomplished, where as non-functional acts describe more specific actions for achieving a particular result. Although the functional steps and nonfunctional acts may be described or claimed in a particular order, the present invention is not necessarily limited to any particular ordering or combination of acts and/or steps.

Figure 4:
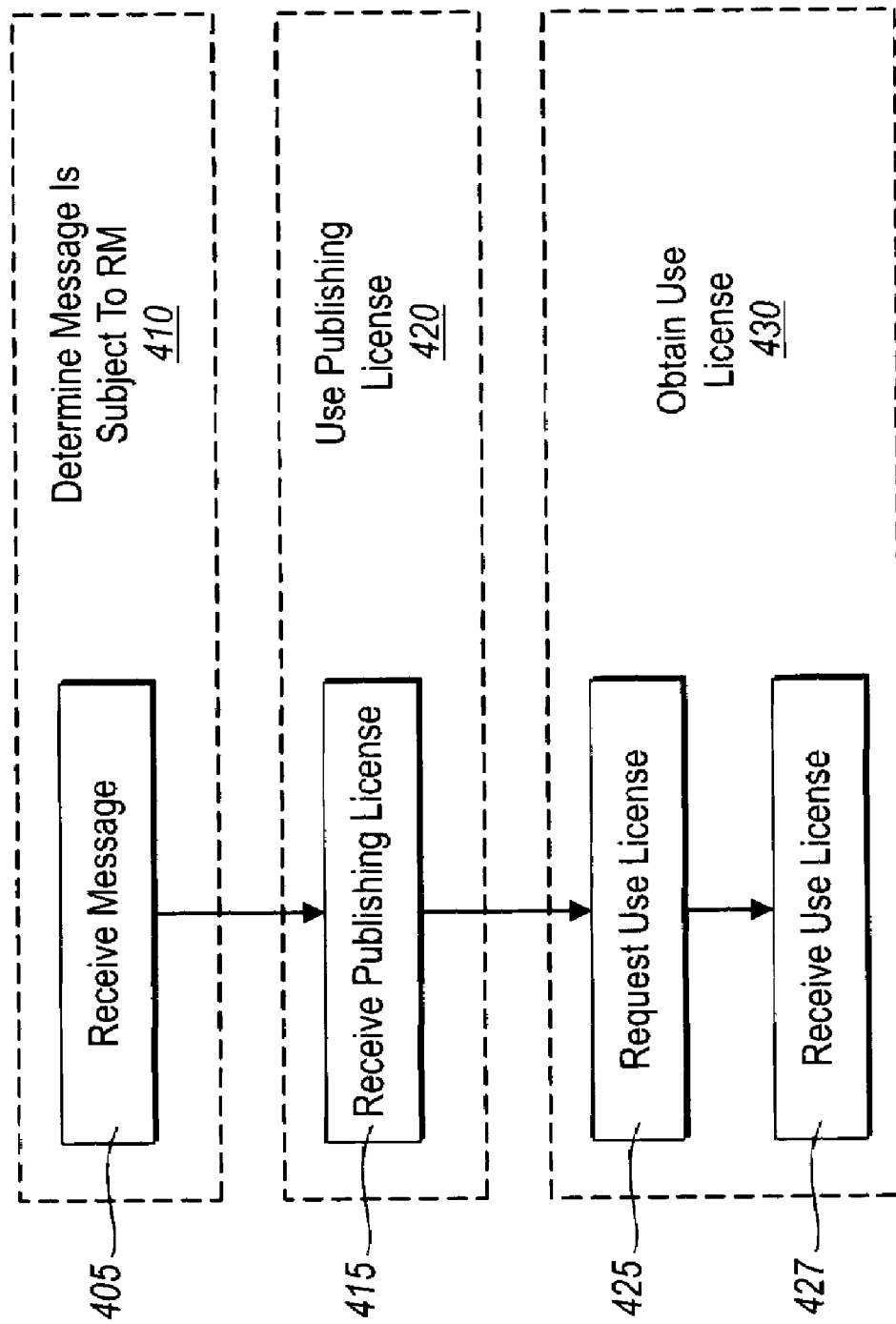
FIG. 4 illustrates example acts of and steps for pre-licensing content subject to rights management in accordance with example embodiments.

FIG. 4 illustrates example steps and acts used in pre-licensing content subject to rights management in order to allow a principal access to the content when the principal does not have access to the rights management server. A step for determining (410) that a message is subject to rights management may include the act of receiving (405), by a message server, a message, which is subject to rights management in that access to message is controlled through a rights management server. Only a part of the message needs be controlled through a rights management server in order for the received message to be determined as subject to rights management. The part of the message that is subject to rights management may be encrypted and may also be a protected contact, protected document, protected calendar item or protected meeting request.

A step for using (420) a received publishing license for identifying the message to the rights management server may include the act of receiving (415), by the message server, a publishing license. The publishing license may include a reference to several principals such that when the message server requests the use licenses, the rights management server may validate that the principals are intended to have access to the message. The publishing license may further include rights expressions that limit the types of operation the principals are allowed to perform on the message. For example, the rights expression may limit the principals operation in re-licensing, printing, copying, forwarding, sharing, delegating and saving. Alternatively, the rights expression may be a default value, e.g., read-only, which may be configured differently for each enterprise by an administrator. The rights expression may further include an expiration feature, which limits either the number of times or a time period the rights expression is available. In addition, the publishing license may include a hash used to verify the message has not changed and a signing by the rights management server used to verify the publishing license is valid.

A step for obtaining (430) a use license may include the acts of requesting (425) a use license and receiving (427) a use license by the message server on behalf of the principals. The request for the use license is made to allow the principal access to the message and includes the publishing license to identify the message to the rights management server. The use license is received so that the principals may access the message without having to request the use license from the rights management server. A part of the message controlled through the rights management server may be encrypted and the use license may include a content key that can be used in decrypting the part of the message that is encrypted. The act of requesting (425) the use license may further include sending a rights account certificate to the rights management server to verify that the message server has the authority to obtain the use license on behalf of the principal. Moreover, the message server may request multiple use licenses on behalf of the principal so that the principal may access the message on multiple machines. In addition, the use license may be stored on the message server separate from the message.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CDROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
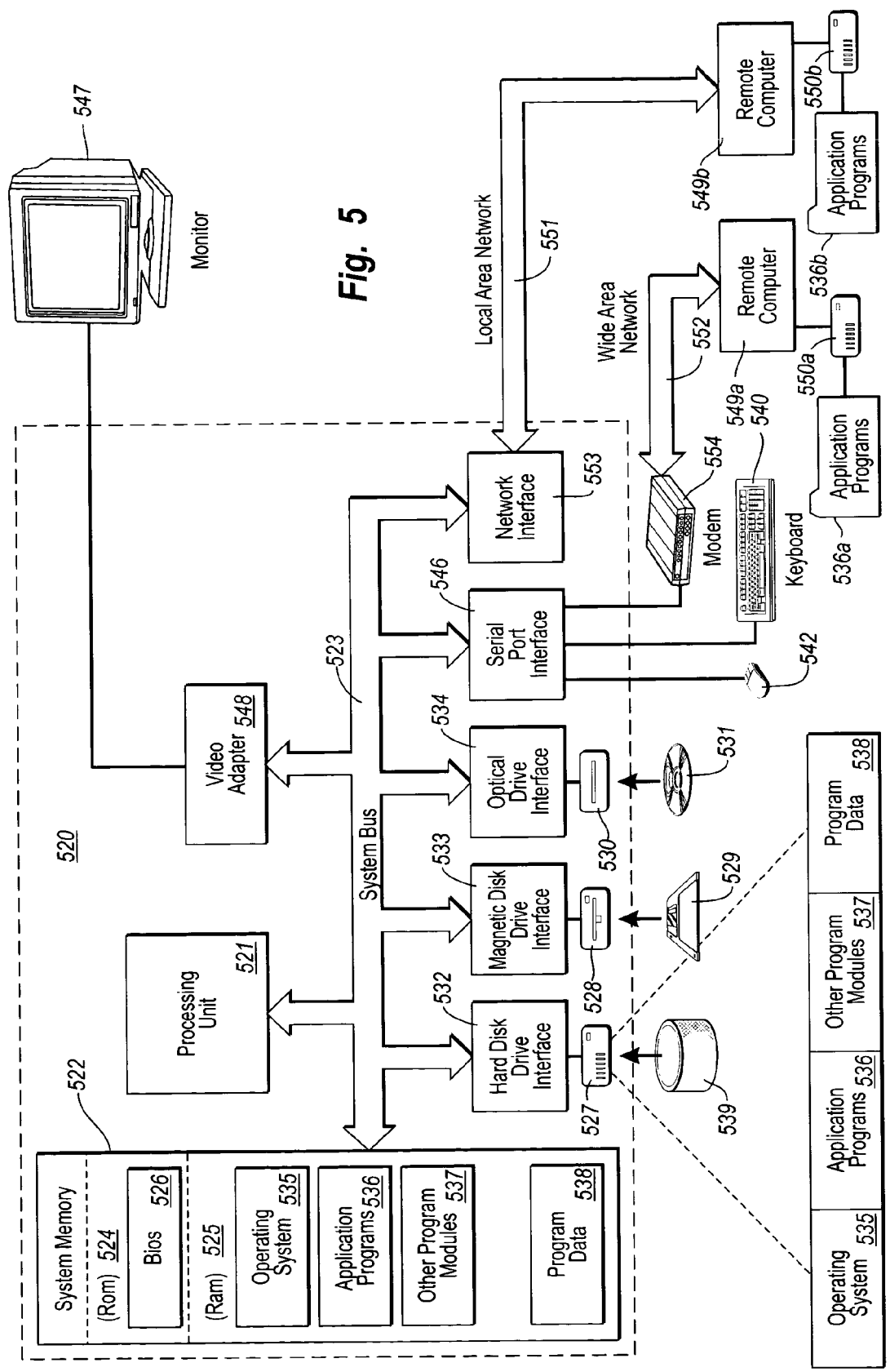
FIG. 5 illustrates an example system that provides a suitable operation environment for the present invention.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, handheld devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during startup, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CDROM or other optical media. Optical disc drive 530 is one example of an optical media recorder. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A principal may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

Accordingly, the present invention may be practiced in a computer that is connected to an optical media recorder over a computer network. In some new systems, system bus 523 is encapsulated and sent across a new transport, such as a TCP/IP network. For example, ISCSI (Internet SCSI or Internet Small Computer Systems Interface) is one fairly well-known implementation of a TCP/IP-based protocol for establishing and managing connections between IP-based storage devices, hosts, and principals.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a messaging system comprising a rights management server that controls the type of operations principals can perform on protected content and a message server that receives messages and makes them available to principals or their agents, a method of pre-licensing content subject to rights management in order to allow a principal access to the content when the principal does not have access to the rights management server, the method comprising acts of:

receiving, by the message server, which is distinct from a rights management server, a message from a sending computing system, the message being subject to rights management in that access to at least a part of the message is controlled through a rights management server, the message server recognizing that the message is subject to rights management, receiving, by the message server, a publishing license from the sending computing system, the publishing license containing a rights expression identifying the at least part of the message subject to rights management, specifying one or more intended recipients for the at least part of the message subject to rights management, and specifying one or more rights for each of the one or more intended recipients, and wherein the rights expression limits the one or more principals' operation in at least one of re-licensing, printing, forwarding and sharing of the message, the publishing license being previously acquired by the sending computing system from the rights management server;

upon the message server recognizing that the message is subject to rights management, requesting from the rights management server, by the message server on behalf of one or more principals, at least one use license for allowing the one or more principals access to the message, wherein the request includes the publishing license to identify the at least part of the message subject to rights management to the rights management server;

the rights management server issuing to the message server one or more use licenses that allow one or more principals to access the at least part of the message subject to rights management without subsequent access to a rights management server;

receiving, by the message server on behalf of the one or more principals, the at least one use license so that the one or more principals may obtain the at least one use license from the message server and access the at least part of the message subject to rights management without the one or more principals having to request the at least one use license from a rights management server;

providing, by the message server, to at least one of the one or more principals, one or more of the at least one use license; and receiving, by the principal, from the message server, the content and the use license such that the principal is enabled to access the content in accordance with the use license at a time when the principal does not have access to a rights management server.

2. The method of claim 1, wherein the at least a part of the message controlled through the rights management server is encrypted, and wherein the use license comprises a content key used in decrypting the part of the message that is encrypted.

3. The method of claim 2, wherein the part of the message that is encrypted is at least one of a protected contact, protected document, protected calendar item or protected meeting request.

4. The method of claim 1, wherein the act of requesting at least one use license further includes sending an authentication to the rights management server to verify that the message server has the authority to obtain the at least one use license on behalf of the one or more principals.

5. The method of claim 1, wherein the message server requests multiple use licenses on behalf of the one or more principals so that the one or more principals may access the message on multiple machines.

6. The method of claim 1, wherein the at least one use license is stored by the message server separate from the message.

7. The method of claim 1, wherein the publishing license includes a reference to the one or more principals such that when the message server requests the at least one use license, the rights management server may validate that the one or more principals are intended to have access to the message.

8. The method of claim 7, wherein the publishing license further includes at least one rights expression that limits the types of operations the one or more principals are allowed to perform with regard to copying of the message.

9. The method of claim 8, wherein the rights expression is a default value of read only.

10. The method of claim 7, wherein the at least one rights expression in the publishing license limits the one or more principals' operation of printing the message.

11. The method of claim 10, wherein the rights expression includes an expiration feature, which limits at least one of the number of times or a time period the at least one rights expression is available.

12. The method of claim 1, wherein the at least one principal is a process, user, machine, server or client.

13. The method of claim 1, wherein the publishing license further comprises one or more of a hash used to verify the message has not changed and a signing by the rights management server used to verify that the publishing license is valid.

14. The method of claim 1, wherein the publishing license references multiple principals for which the message is intended, and wherein the message server retrieves use licenses on behalf of the multiple principals by a batch request process for balancing the load on the rights management server.

15. In a messaging system comprising a rights management server that controls the type of operations principals can perform on protected content and a message server that receives messages and makes them available to principals or their agents, a method of pre-licensing content subject to rights management in order to allow a principal access to the content when the principal does not have access to the rights management server, the method comprising steps for:

receiving by a message server a message and a publishing license from a sending computing system, the message containing protected content;

determining by the message server that the message received from a sending computing system contains protected content which is subject to rights management in that access to at least a part of the message is controlled through a rights management server, the rights management server issuing one or more user licenses that allow one or more principals to access the at least part of the message subject to rights management;

upon determining by the message server that the message received from a sending computing system contains protected content, requesting by the message server from a rights management server at least one use license, the publishing license being previously acquired by the sending computing system from the rights management server, wherein the rights management server issues, to the message server, one or more use licenses that allow one or more principals to access the at least part of the message subject to rights management without subsequent access to a rights management server; and obtaining, from the rights management server, by the message server, which is distinct from the rights management server, on behalf of one or more principals, said at least one use license, and such that the use license provides the principal access to the content in accordance with the use license at a time when the principal does not have access to the rights management server.

16. The method of claim 15, wherein the at least a part of the message controlled though the rights management server is encrypted, and wherein the use license comprises a content key used in decrypting the part of the message that is encrypted.

17. The method of claim 16, wherein the part of the message that is encrypted is at least one of a protected contact, protected document, protected calendar item or protected meeting request.

18. The method of claim 15, wherein step for obtaining at least one use license includes the act of requesting, by the message server on behalf of the one or more principals, the at least one use license, wherein the request includes the received publishing license for identifying the message to the rights management server, and wherein the request includes an authentication certificate for the rights management server for verifying that the message server has the authority to obtain the at least one use license on behalf of the one or more principals.

19. The method of claim 18, wherein the received publishing license includes a reference to the one or more principals such that when the message server requests the at least one use license, the rights management server may validate that the one or more principals are intended to have access to the message.

20. The method of claim 19, wherein the publishing license further includes at least one rights expression that limits forwarding of the message by the one or more principals of the message.

21. The method of claim 19, wherein the at least one fights expression in the publishing license limits the one or more principals' operation of re-licensing.

22. The method of claim 21, wherein the rights expression includes an expiration feature, which limits a number of times the at least one rights expression is available.

23. The method of claim 19, wherein the fights expression is a default value of read only.

24. The method of claim 15, wherein the message server requests multiple use licenses on behalf of the one or more principals so that the one or more principals may access the message on multiple machines.

25. The method of claim 15, wherein the at least one use license is stored by the message server separate from the message.

26. The method of claim 15, wherein the at least one principal is a process, user, machine, server or client.

27. The method of claim 15, wherein the received publishing license further comprises one or more of a hash used to verify the message has not changed and a signing by the rights management server used to verify that the publishing license is valid.

28. The method of claim 15, wherein the received publishing license references multiple principals for which the message is intended, and wherein the message server retrieves use licenses on behalf of the multiple principals by a batch requests process for balancing the load on the fights management server.

29. In a messaging system comprising a rights management server that controls the type of operations principals can perform on protected content and a message server that receives messages and makes them available to principals or their agents, a computer program product comprising one or more computer readable media carrying computer executable instructions that implement a method of pre-licensing content subject to rights management in order to allow a principal access to the content when the principal does not have access to the rights management server, the method comprising:

receiving, by the message server, which is distinct from a rights management server, a message from a sending computing system, the message being subject to rights management in that access to at least a part of the message is controlled through a rights management server, the message server recognizing that the message is subject to rights management, receiving, by the message server, a publishing license from the sending computing system, the publishing license containing a rights expression identifying the at least part of the message subject to rights management, specifying one or more intended recipients for the at least part of the message subject to rights management, and specifying one or more rights for each of the one or more intended recipients, and wherein the rights expression limits the one or more principals' operation in at least one of re-licensing, printing, forwarding and sharing of the message, the publishing license being previously acquired by the sending computing system from the rights management server;

upon the message server recognizing that the message is subject to rights management, requesting from the rights management server, by the message server on behalf of one or more principals, at least one use license for allowing the one or more principals access to the message, wherein the request includes the publishing license to identify the at least part of the message subject to rights management to the rights management server;

the rights management server issuing to the message server one or more use licenses that allow one or more principals to access the at least part of the message subject to rights management without subsequent access to a rights management server;

receiving, by the message server on behalf of the one or more principals, the at least one use license so that the one or more principals may obtain the at least one use license from the message server and access the at least part of the message subject to rights management without the one or more principals having to request the at least one use license from a rights management server;

providing, by the message server, to at least one of the one or more principals, one or more of the at least one use license; and receiving, by the principal, from the message server, the content and the use license such that the principal is enabled to access the content in accordance with the use license at a time when the principal does not have access to a rights management server.

30. The computer program product of claim 29, wherein the publishing license includes a reference to the one or more principals such that when the message server requests the at least one use license, the rights management server may validate that the one or more principals are intended to have access to the message.

31. The computer program product of claim 30, wherein the publishing license further includes at least one rights expression that limits at least one of coping and delegating.

32. The computer program product of claim 30, wherein the at least one rights expression in the publishing license limits the one or more principals' operation in saving.

33. The computer program product of claim 32, wherein the rights expression includes an expiration feature, which limits at least one of the number of times or a time period the at least one rights expression is available.

34. The computer program product of claim 30, wherein the rights expression is a default value of read only.

35. The computer program product of claim 29, wherein the at least one principal is a process, user, machine, server or client.

36. The computer program product of claim 29, wherein the publishing license references multiple principals for which the message is intended, and wherein the message server retrieves use licenses on behalf of the multiple principals by a batch request process for balancing the load on the rights management server.

37. In a messaging system comprising a rights management server that controls the type of operations principals can perform on protected content and a message server that receives messages and makes them available to principals or their agents, a computer program product comprising one or more computer readable media carrying computer executable instructions that implement a method of pre-licensing content subject to rights management in order to allow a principal access to the content when the principal does not have access to the rights management server, the method comprising steps for:

receiving by a message server a message and a publishing license from a sending computing system, the message containing protected content;

determining by the message server that the message received from a sending computing system contains protected content which is subject to rights management in that access to at least a part of the message is controlled through a rights management server, the rights management server issuing one or more user licenses that allow one or more principals to access the at least bart of the message subject to rights management;

upon determining by the message server that the message received from a sending computing system contains protected content, requesting by the message server from a rights management server at least one use license, the publishing license being previously acquired by the sending computing system from the rights management server, wherein the rights management server issues, to the message server, one or more use licenses that allow one or more principals to access the at least part of the message subject to rights management without subsequent access to a rights management server; and obtaining, from the rights management server, by the message server, which is distinct from the rights management server, on behalf of one or more principals, said at least one use license, and such that the use license provides the principal access to the content in accordance with the use license at a time when the principal does not have access to the rights management server.

38. The computer program product of claim 37, wherein the at least a part of the message controlled through the rights management server is encrypted, and wherein the use license comprises a content key used in decrypting the part of the message that is encrypted, and wherein the part of the message that is encrypted is at least one of a protected contact, protected document, protected calendar item or protected meeting request.

39. The computer program product of claim 37, wherein step for obtaining at least one use license includes the act of requesting, by the message server on behalf of the one or more principals, the at least one use license, wherein the request includes the received publishing license for identifying the message to the rights management server, and wherein the request includes an authentication for the rights management server for verifying that the message server has the authority to obtain the at least one use license on behalf of the one or more principals.

40. The computer program product of claim 37, wherein the message server requests multiple use licenses on behalf of the one or more principals so that the one or more principals may access the message on multiple machines.

41. The computer program product of claim 37, wherein the at least one use license is stored by the message server separate from the message.

42. The computer program product of claim 37, wherein the received publishing license further includes at least one rights expression that includes an expiration feature, which limits a number of times the at least one rights expression is available.

43. The computer program product of claim 37, wherein the at least one principal is a process, user, machine, server or client.

44. The computer program product of claim 37, wherein the received publishing license references multiple principals for which the message is intended, and wherein the message server retrieves use licenses on behalf of the multiple principals by a batch request process for balancing the load on the rights management server.

* * * * *